United States Patent Office 2,822,264
Patented Feb. 4, 1958

2,822,264

SEPARATING NICKEL FROM SOLUTIONS CONTAINING NICKEL AND COBALT

Robert Lucien Benoit, Vancouver, British Columbia, and Vladimir Nicolaus Mackiw, Fort Saskatchewan, Alberta, Canada, assignors to Sherritt Gordon Mines Limited, Toronto, Ontario, Canada, a company of Ontario, Canada No Drawing. Application April 11, 1956
Serial No. 577,445

7 Claims. (Cl. 75—119)

This invention relates to the separation of values of nickel from an aqueous solution which contains dissolved salts of nickel and cobalt. The invention is particularly directed to the separation of small amounts of nickel from a cobalt containing solution to permit the recovery therefrom of cobalt substantially free from nickel.

Nickel and cobalt metals are similar in many physical and chemical characteristics. Values of both metals usually occur in natural mineral deposits and, usually, they cannot be separated by conventional ore dressing processes. Thus, when values of both nickel and cobalt are present in metal bearing material they tend to remain together in the products derived from the several hydrometallurgical and/or pyrometallurgical processes to which the metal bearing material is subjected for the extraction and recovery of the respective metals.

It is known that values of nickel and cobalt can be extracted by hydrometallurgical methods from nickel-cobalt bearing material with a high degree of extractive efficiency. Also, it is known that in treating cobalt-nickel bearing materials, a nickel product substantially free from cobalt can be obtained. However, it has been very difficult and costly to separate small amounts of nickel from cobalt to produce a cobalt product substantially free from nickel.

We have found that small amounts of nickel which are present in nickel-cobalt solutions can be precipitated from such solutions by a very simple and easily conducted sequence of operations to permit, in a following cobalt recovery step, the recovery of cobalt product metal substantially free from nickel.

The method of the present invention is in effect an application of the phenomenum that the cobaltic ion forms a much more stable ammine complex than the cobaltous ion and that it is much easier to oxidize cobaltous ion to cobaltic ion than to oxidize nickelous ion to nickelic ion in ammoniacal solution.

The method involves, in its simplest form, the treatment of an ammoniacal solution having a pH value below about pH 6.5 and which contains, in solution, a minor amount of nickel sulphate and a larger amount of cobalt sulphate, at least a major portion of the cobalt salt being in trivalent form, at least about 4 gram mols of bound ammonia per gram atom of cobalt, and at least about 300 grams of ammonium sulphate per litre. The treatment involves the step of reducing trivalent cobalt sulphate to bivalent cobalt sulphate in amount at least equivalent to the amount of nickel sulphate contained in the solution, and adding sulphuric acid to the solution in amount at least the stoichiometric equivalent of the ammonia released in the reduction of trivalent cobalt to bivalent cobalt whereby dissolved nickel values are precipitated from the solution concurrently with a small amount of bivalent cobalt.

The term "bound" or "complexed" ammonia used herein is intended to mean that ammonia which is combined with a metal ion to form a complex ion.

The invention is, of course, based on observations made and results obtained in the conduct of the method over a long series of investigations and is independent of hypothetical considerations. A possible explanation is that in the final acidification step bivalent cobalt precipitates as cobaltous ammonium sulphate carrying with it nickel ammonium sulphate, or it may be that the bivalent cobalt precipitates with nickel as a nickel-cobalt ammonium sulphate. Whatever may be the principle involved in the phenomenum, it is found that nickel values precipitate from the solution on the reduction of a small amount of trivalent cobalt to bivalent cobalt and on the addition of a small amount of sulphuric acid and the problem of the presence in the solution of the small amount of nickel is overcome.

The invention is independent of the origin or source of the solution from which the nickel values are to be separated. That is, the metal values of interest can be contained originally in an ore, a concentrate, a matte or a speiss, scrap metal or a crude metal alloy, such as a crude iron-cobalt-nickel alloy such as is formed in smelting iron-nickel-cobalt bearing lateritic or garnierite ores or concentrates. Usually the original nickel-cobalt bearing material will contain at least a small amount of iron.

Nickel-cobalt values can be extracted from the metal bearing material and dissolved in a leach solution by leaching the metal bearing material with a solvent under leaching conditions best adapted for the type of material being treated to obtain maximum extraction of nickel and cobalt values within a reasonable period of time.

Leach solution containing dissolved nickel and cobalt values is then treated to separate impurities which would tend to contaminate the purity of the product nickel and cobalt metals subsequently recovered from the solution, or to convert them to a form in which they have no contaminating effect on the product metals.

The solution treatment steps prior to the preparation of the solution for the precipitation of cobalt substantially free from nickel depends on the impurities associated with the nickel and cobalt in the starting material and on the particular leaching method employed to extract the nickel and cobalt values and dissolve them in leach solution. In leaching metal bearing material with a strong aqueous ammonia or strongly ammoniacal ammonium sulphate solution in the presence of a free oxygen bearing gas such as air, iron values convert to and are precipitated from the solution as ferric oxide or ferric hydrate and very little, if any, enter the solution. However, if an acid solvent is employed, such as a sulphuric acid solution, at least some iron may, and usually does, dissolve in the solution. A convenient method of separateing iron from such a solution is to neutralize the solution with ammonia to about pH 5.5 and react the solution with a free oxygen bearing gas, such as air, for a period of time sufficient to convert dissolved iron values to and precipitate them from the solution as ferric oxide or ferric hydrate. Precipitated iron values are separated from the solution, such as by filtration.

Any copper dissolved in the solution can be precipitated therefrom, such as by cementation, although it would be preferred to use nickel or cobalt powder as the cementation agent rather than iron to avoid contamination of the solution.

If the ratio of nickel to cobalt in the solution is high, that is higher than about 1:1, it usually is economic to recover nickel product metal therefrom prior to the treatment of the solution for the recovery of cobalt values. A convenient and economic method of recovering the major portion of such nickel values is to adjust the ammonia content of the solution to a little less than 2 gram mols ammonia per gram atom of nickel and subject the solution to reaction with hydrogen at a temperature of about 350° F. and under a partial pressure of hydrogen of about 300 pounds per square inch. The major portion of the nickel values can be precipitated from the solution as product metal powder substantially free from cobalt down to that nickel to cobalt ratio at which cobalt commences to precipitate in progressively increasing amounts. Usually, nickel can be precipitated from such a solution down to a nickel to cobalt ratio of 1:1 or less without appreciable precipitation of cobalt. Nickel powder metal is separated from the solution and the solution is then in condition for treatment for the removal of residual dissolved nickel values.

The ammonia content of the solution is adjusted to provide about 4.5 gram mols of ammonia per gram atom of nickel plus cobalt. If the cobalt-nickel bearing solution is the result of an ammonia leaching process, this adjustment is made by heating the solution for a period of time sufficient to release unbound ammonia to the desired ammonia content. Released ammonia can be recovered, of course, for re-use. If the solution is the product of an acid leaching process, the desired ammonia ratio is obtained by the addition of ammonia.

The ratio of about 4.5 gram mols of ammonia per gram atom of nickel plus cobalt is, of course, a preferred ratio. More ammonia can be added, if desired, but it would only increase the amount of unbound ammonia which must be released in the following ammonia distillation step. Below about 4.0 gram mols of ammonia per gram atom of nickel plus cobalt, other cobaltic compounds appear to be formed which are not desired in the solution. At the preferred mol ratio of about 4.5, oxidation of cobaltous to cobaltic cobalt proceeds rapidly and the end point is determined by the reduction to zero of the oxygen absorption. Solutions with cobalt to nickel ratios of from 0.7:1 to 50:1 have been successfully oxidized.

The oxidation reaction preferably is conducted at above atmospheric temperature. At room temperature there is a tendency of the cobaltous cobalt and oxygen to form peroxy-cobalt compounds which are relatively unstable and undesirable. Oxidation at above atmospheric temperature, of the order of from 90°-200° F., favours the formation of cobaltic cobalt and inhibits the formation of peroxy-cobalt compounds.

The ammonia distillation step serves several useful purposes. Peroxy-cobalt compounds are destroyed with liberation of oxygen and with a corresponding increase in the cobaltic concentration. Released ammonia is recovered for re-use. The volume of the solution is reduced with a corresponding increase in the concentration of cobalt salts in the solution. This step is conducted at about or slightly above the boiling temperature of the solution and is continued until a ratio of about 2.3 gram mols of ammonia per gram atom of nickel and about 5 gram mols ammonia per gram atom of cobalt is present in the solution. In practice, it is only necessary to reduce the ammonia content to the desired ammonia to nickel ratio as the ammonia to cobalt ratio adjusts itself to the desired ratio as distillation proceeds. At the end of the distillation period, substantially all the original cobalt is present in the solution as trivalent or cobaltic cobalt, $Co^{+++}$.

Sulphuric acid is added to the solution from the distillation step until the pH value of the solution is reduced to below 6.5 and, preferably, from about pH 3.5 to pH 2.5. The major portion of the nickel values precipitate from the solution as nickel ammonium sulphate with co-precipitation of only such very minor amounts of bivalent cobalt as may be present in the solution. The nickel ammonium sulphate can be separated from the solution, such as by filtering or centrifuging, and treated by known methods for the recovery of nickel. Cobalt values associated with the nickel ammonium sulphate in this precipitation step can be recovered, if desired, during its treatment and returned to this method.

It normally is not economic to precipitate all the nickel ammonium sulphate in the precipitation step to remove all the dissolved nickel values in view of the concurrent high precipitation of cobalt. Therefore, the solution from the nickel ammonium sulphate precipitation step is conducted to produce a solution which still contains from about 0.3 to about 0.6 gram per litre nickel. This nickel normally would follow the cobalt in the cobalt recovery step, and would contaminate the purity of the cobalt.

In the preparation of the solution for separation of residual nickel values, the ammonium sulphate content should be adjusted to about 300 grams per litre either by the addition of ammonium sulphate to the solution or by its formation in the solution during the treatments to which the solution is subjected prior to the present method. Ammonium sulphate tends to suppress the solubility of nickel and bivalent cobalt in the solution. Less than about 300 grams per litre requires the addition of excess cobalt in the following nickel precipitation step and the nickel separation from the solution is not as effective.

Finely divided cobalt powder, from about 150 to 325 mesh standard Tyler screen, is added to the solution in amount at least equivalent to the nickel present in the solution and, preferably, a very slight excess. On the addition of the cobalt powder accompanied by active agitation of the solution, an equivalent amount of trivalent or cobaltic cobalt dissolved in the solution is reduced to bivalent or cobaltous cobalt. The reduction of trivalent cobalt to bivalent cobalt is accompanied by the release of ammonia. Sufficient sulphuric acid is added to the solution to neutralize the ammonia and retain the pH value at about 2.5. As the pH value of the solution is reduced, cobaltous cobalt precipitates from the solution, carrying with it dissolved nickel values. After separation of the cobalt-nickel precipitate, which can be recycled to the ammoniation stage, the solution is in condition for recovery of dissolved cobalt values substantially free from nickel.

As the solubility of nickel ammonium sulphate in ammoniacal solution varies directly with the temperature, and it is desired to obtain maximum precipitation of nickel ammonium sulphate from the solution, the solution should be at a temperature of about 110° F. or less at the end of the powder cobalt-sulphuric acid addition step. The solution can be cooled to the desired temperature at any time following the ammonia distillation step.

It is preferred to employ cobalt powder metal in the reduction of trivalent cobalt to bivalent cobalt as this powder is produced in the following step of the overall process in which the cobalt bearing solution is reacted with hydrogen at elevated temperature and under superatmospheric pressure to precipitate dissolved cobalt values as cobalt metal powder. However, cobalt sulphate can be employed, if desired. Also, other metal powders can be employed, such as zinc and iron, but they would tend to contaminate the purity of the cobalt recovered from the solution in the subsequent reduction step.

The following examples illustrate the treatment of an ammoniacal solution containing, in solution, values of cobalt and nickel:

(1) The starting solution contained 27.8 g. p. l. (grams per litre) cobalt; 27.8 g. p. l. nickel; 155 g. p. l. ammonium sulphate and 72.6 g. p. l. ammonia. This solution was reacted for 30 minutes at 95° F. under a partial pressure of oxygen of 20 pounds per square inch. After standing quiescent for 15 hours, the solution contained 4.0 g. p. l. bivalent or cobaltous cobalt; 23.8 g. p. l. trivalent or cobaltic cobalt; 27.8 g. p. l. nickel and 48.9 g. p. l. ammonia.

Live steam was fed into 2.1 litres of this solution for 30 minutes and the volume of the solution was reduced to 1.48 litres. The solution then contained 2.1 g. p. l. bivalent cobalt, and 25.1 g. p. l. ammonia.

The pH value of the solution was reduced to between 3.5 and 2.5 by the addition of sulphuric acid. Nickel ammonium sulphate precipitated from the solution to form a residue which, after separation by filtration and drying, weighed 415 grams and analyzed 1.20% Co; 13.0% Ni; and 18% S. 1.23 litres of solution remained which contained 45.1 g. p. l. cobalt; 0.38 g. p. l. nickel; and 80 g. p. l. sulphur as sulphate.

30 grams of ammonium sulphate, to produce a total ammonium sulphate concentration of about 300 g. p. l. and 0.175 gram of cobalt powder finer than 300 mesh standard Tyler screen were added to 0.5 litre of this solution. The solution was actively agitated for 5 minutes after which the pH value was reduced to pH 2.5 by the addition of sulphuric acid. At a temperature below 110° F., a complex cobalt-nickel ammonium sulphate precipitated from the solution was separated by filtration, and was washed and dried. The precipitate weighed 11.5 grams and analyzed 11.8% Co and 3.32% nickel. The volume of the residual solution was 0.510 litres and contained 39.7 g. p. l. cobalt and 0.11 g. p. l. nickel.

Reaction of this solution at 350° F. under a partial pressure of hydrogen of 420 pounds per square inch produced cobalt powder which analyzed 99.0% cobalt and 0.28% nickel.

(2) The solution contained 28.2 g. p. l. cobalt, 4.0 g. p. l. nickel, 194 g. p. l. ammonium sulphate and 6 gram mols of ammonia per gram atom of nickel and cobalt. Air was bubbled through the solution for three hours at 75° F. The solution was then permitted to stand for three days, after which it was brought to boiling temperature and the pH value was reduced to 2.5 by the release of ammonia and the addition of sulphuric acid. After filtering precipitated nickel ammonium sulphate, the solution contained 32.3 g. p. l. cobalt and .12 g. p. l. nickel, that is, a cobalt to nickel ratio of 270:1. About 1.3% of the cobalt in the solution was precipitated with the nickel ammonium sulphate. About 0.8 gram per litre finely divided cobalt was added to the solution and sulphuric acid was added to reduce the pH to 2.5. The solution was cooled to a temperature below 110° F. and a complex nickel-cobalt ammonium sulphate recipitated from the solution. After separation of the precipitated complex cobalt-nickel ammonium sulphate, the solution contained 29.2 g. p. l. cobalt and 0.04 g. p. l. nickel or a cobalt to nickel ratio of 700:1. 4.3% of the cobalt was precipitated with the nickel in the second cobalt-nickel ammonium sulphate, for a total of 5.6% of the total cobalt precipitated in the two steps. This precipitated cobalt is, of course, recovered in the overall process.

The method of the present invention possesses a number of important advantages. It can be conducted easily and economically as part of an overall commercial scale operation for the production of nickel and cobalt. It reduces the nickel content of a solution which contains nickel and cobalt to the extent that cobalt product metal can be produced which is substantially free from nickel. Also, only a very minor amount of cobalt is precipitated with the nickel and this can be recycled to a preceding step in the overall process without loss of either nickel or cobalt values.

What we claim as new and desire to protect by Letters Patent of the United States of America is:

1. The method of separating nickel from cobalt which comprises preparing an aqueous ammoniated solution which contains, in solution, a minor amount of nickel sulphate and a larger amount of cobalt sulphate, substantially all the dissolved cobalt values being in trivalent form, at least about 4 gram mols of bound ammonia per gram atom of cobalt plus nickel and at least about 300 grams of ammonium sulphate per litre, agitating the solution, reducing an amount of trivalent cobalt to bivalent cobalt at least equivalent to the amount of nickel in the solution, and at a temperature below about 110° F. adjusting the pH value of the solution to below about 3.5, whereby nickel and bivalent cobalt values are precipitated from the solution, and separating precipitated nickel and cobalt values from the solution.

2. The method of separating nickel from cobalt according to claim 1 in which trivalent cobalt is reduced to bivalent cobalt by the addition to the solution of a member of the group consisting of finely divided cobalt powder and cobalt sulphate.

3. The method of separating nickel from cobalt according to claim 1 in which the pH value of the solution is adjusted to below 3.5 by the addition of sulphuric acid to the solution.

4. The method of separating nickel from cobalt according to claim 2 in which the pH value of the solution is adjusted to below 3.5 by the addition of sulphuric acid to the solution.

5. The method of separating nickel from cobalt which comprises preparing an aqueous ammoniated solution which contains, in solution, dissolved compounds of nickel and cobalt, adjusting the ammonia concentration of the solution to contain at least about 4 gram mols ammonia per gram atom cobalt plus nickel, reacting the solution at above atmospheric temperature and under a partial pressure of oxygen above about 20 pounds per square inch for a period of time sufficient to convert at least a major portion of dissolved cobalt values to trivalent cobalt; adding acid to the solution in amount sufficient to precipitate the major portion of the dissolved nickel values; separating precipitated nickel values from the solution; reducing an amount of trivalent cobalt to bivalent cobalt at least equivalent to the amount of nickel remaining in the solution, and at a temperature below about 110° F. adjusting the pH value of the solution to below about 3.5, whereby nickel and bivalent cobalt values are precipitated from the solution, and separating precipitated nickel and cobalt values from the solution.

6. The method of separating nickel from cobalt according to claim 5 in which trivalent cobalt is reduced to bivalent cobalt by the addition to the solution of a member of the group consisting of finely divided cobalt powder and cobalt sulphate.

7. The method of separating nickel from cobalt according to claim 5 in which the pH value of the solution is adjusted to below 3.5 by the addition of sulphuric acid to the solution.

References Cited in the file of this patent

UNITED STATES PATENTS

| | | |
|---|---|---|
| 2,647,820 | Forward | Aug. 4, 1953 |
| 2,735,760 | Allen et al. | Feb. 21, 1956 |